United States Patent [19]

Threatt

[11] 4,099,732
[45] Jul. 11, 1978

[54] EXPANDABLE SHAFT

[76] Inventor: James W. Threatt, Rte. 1, Box 159, Darlington, S.C. 29532

[21] Appl. No.: 803,297

[22] Filed: Jun. 3, 1977

[51] Int. Cl.² ............... B23B 31/40; B65H 65/18
[52] U.S. Cl. ............................ 279/2 A; 242/72 B
[58] Field of Search ............ 279/2 A, 2 R; 242/72 B, 242/72 R; 82/44; 269/48.1; 29/113 R

[56] References Cited

U.S. PATENT DOCUMENTS

| 2,215,069 | 9/1940 | Meisel | 29/113 R |
| 2,849,192 | 8/1958 | Fairchild | 29/113 R |
| 3,053,467 | 9/1962 | Gidge | 242/72 B |

Primary Examiner—Gil Weidenfeld
Attorney, Agent, or Firm—C. Gordon McBride

[57] ABSTRACT

An expandable shaft for the mounting of cores, working tools, and the like comprising a perforated metal shell with an internal elastomeric liner positioned therein and in intimate contact with the interior thereof, portions of the liner extending into the shell perforations and extending to the outer surface of the shell to provide a smooth surface therewith. Both the liner and shell are expandable upon the generation of internal pressure for a combined engagement with and frictional locking of a working tool or the like mounted thereon.

6 Claims, 4 Drawing Figures

EXPANDABLE SHAFT

BACKGROUND OF THE INVENTION

The invention herein relates generally to an expandable shaft, to be utilized primarily on slitter or rewinder machines in the paper and plastics industries, which is particularly adapted to mount and stabilize support tubes or cores, mandrels, blade holders, working tools, and the like.

Expandable shafts are well-known in the art as exemplified by the following U.S. Pat. Nos.

2,849,192 — Fairchild
3,053,467 — Gidge
3,173,325 — Warren et al
3,742,714 — Thomas The patents to Fairchild and Gidge illustrate rigid perforated metal shafts with internal elastomeric liners which, upon the introduction of internal pressure, expand through and beyond the perforation with knob-like protrusions which individually grip the member within which the shaft is received.

Warren et al and Thomas disclose hollow steel shafts which expand upon the introduction of internal pressure for a smooth surface engagement with working tools received thereover.

Neither of the above two systems has been found entirely satisfactory in that, while the solid expandable steel shafts provide a straight and true surface, the metal-to-metal contact gives rise to the possibility of relative rotation, slippage or traveling between the shaft and the work piece thereon. By the same token, the use of projecting elastomeric gripping knobs raises problems with regard to alignment and stability, particularly when working with relatively short work pieces, such as blade holders and the like.

SUMMARY OF THE INVENTION

The invention herein proposes an expandable shaft which incorporates all of the particular advantages of an expandable metal shaft and a shaft incorporating elastomeric gripping portions, this being effected without at the same time encountering the particular disadvantages referred to above.

More particularly, the expandable shaft incorporates a perforated metal shell with an internal elastomeric liner closely conforming thereto and projecting through the perforations so as to completely fill the perforations and present an outer surface constituting a smooth continuation of the outer surface of the metal shell. The material of the shell, as well as the size and orientation of the perforations, is such whereby the shell and liner will expand simultaneously, upon the introduction of internal pressure. The expansion will continue until a positive frictional engagement of the shell with the work piece is achieved, whether it be a tube core or blade holder, thereby providing a straight and true surface for the support of the work piece. At the same time, the portions of the elastomeric liner projecting into the perforations or shell openings will have been brought into positive frictional engagement with the work piece or pieces to prevent any tendency for relative rotation, slippage or the like, such as might occur were there engagement solely between the metal shell and the work piece.

It is contemplated that the size and arrangement of the perforations, as well as the material of the shell and liner, be such so as to enable the desired peripheral expansion at a relatively low pressure, normally in the range of 50 to 200 psig. At the same time, longitudinal expansion is to be maintained at a minimum. Further, while the shell may be of steel, as are the shafts in Warren et al and Thomas, other metals in particular may also be found acceptable. Likewise, while the liner will preferably be rubber, other appropriate rubber-like materials, such as highly elastic plastics, can also be utilized.

DESCRIPTION OF THE PREFERRED EMBODIMENT

Figure 1:
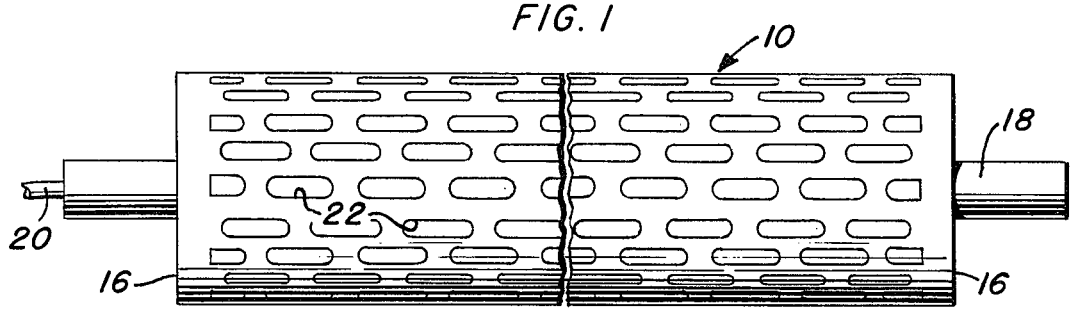
FIG. 1 is an elevational view of an expandable shaft constructed in accordance with the present invention.

Referring now more specifically to the drawings, Reference Numeral 10 is used to designate the expandable shaft comprising the present invention. The shaft 10 consists basically of an outer shell 12 and an inner liner 14 in intimate contact with the shell. The opposed ends 16 of the combined shell and liner are sealed so as to define an air-tight pressurizable chamber. A pair of reduced diameter shaft mounting stems 18 will normally be provided coaxially at the opposed ends of the shaft 10. Finally, appropriate fluid lines 20, such as for example air hoses, will communicate the interior of the combined shell and liner with an appropriate source of pressurized air of the like (not shown).

The shell 12 comprises an elongated perforated hollow metal cylinder capable of expanding upon the generation of an internal pressure. The perforations 22 defined in the shell 12 function both so as to facilitate the desired radial expansion of the shell 12, with limited longitudinal expansion, and so as to allow for selected projection of portions of the interior liner to the exposed surface of the shell, as will be explained subsequently.

Figure 2:
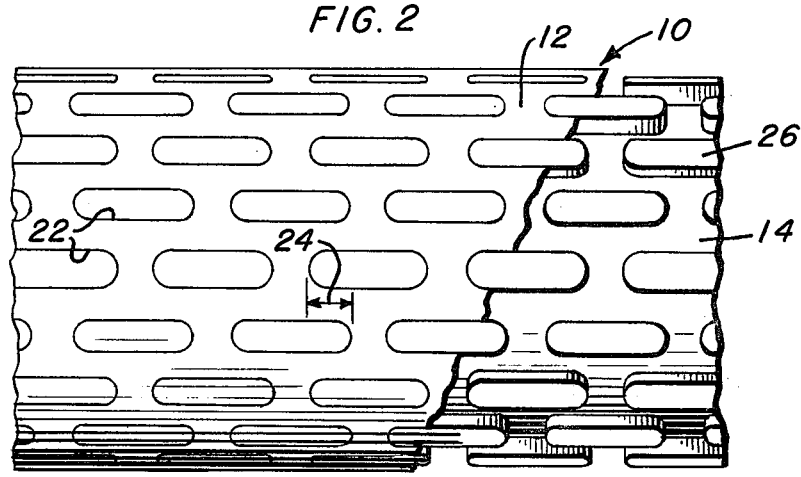
FIG. 2 is an enlarged elevational detail with a portion thereof broken away for purposes of illustration.

The perforations or openings 22 in the shell 12 will preferably be elongated longitudinally or axially of the shell and will be provided completely thereabout and for substantially the full length thereof. As will be best appreciated from FIGS. 1 and 2, the openings 22 are arranged in longitudinally extending circumferentially spaced rows with the openings in each row being equally spaced from each other. In addition, the openings in alternate rows about the shell 12 are in circumferential alignment with each other with the openings in the adjacent rows being longitudinally offset from each other so as to provide for an overlapping of each opening 22 by the two adjacent openings 22 in each of the two adjacent rows. This overlap has been generally indicated by Reference Numeral 24 in FIG. 2. Utilizing elongated perforations of this configuration and orientation will greatly enhance the ability of the shell to expand radially or circumferentially, while at the same time limiting any tendency for a longitudinal expansion to occur, and while also maintaining sufficient inherent rigidity so as to insure a straight and true supporting surface.

While it is considered significant that the openings 22 be longitudinally elongated and in an overlapping pattern, the exact configuration of the openings can vary. For example, elongated triangular openings can be provided, much in the manner of the openings normally seen in a sheet of expanded metal. It will also be recognized that the thickness of the metal shell 12 itself, as well as the size, shape and pattern of the openings 22 are all factors to be considered in connection with the desired longitudinal rigidity and radial expansibility required or desired. In this regard, the greater the open area of each opening, the less will be the pressure necessary for effecting the expansion thereof.

Figure 3:
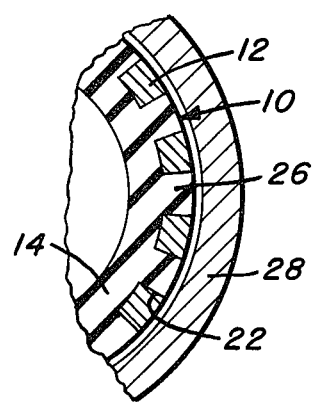
FIG. 3 is a cross-sectional detail through the shaft in its relaxed condition with a work member positioned thereabout.

The elastomeric liner 14, formed of rubber or the like, will be molded or otherwise provided in intimate contact with the interior of the shell 12 with portions 26 of the liner filling each of the perforations or openings 22 and extending to the outer surface of the shell 12 so as to provide a smooth surface continuation thereof. This will be best appreciated from FIG. 3 wherein the relaxed or unexpanded shaft 10 is illustrated.

Figure 4:
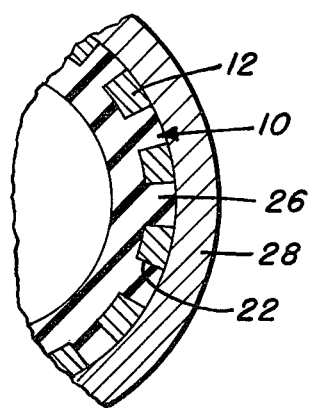
FIG. 4 is a cross-sectional view similar to FIG. 3 with the shaft expanded into engagement with the work member.

Upon the introduction of pressurized air to the sealed interior of the shaft forming liner and shell, the shaft will expand radially so as to engage both the shell 12 and the protrusions 26 of the liner 14 against the inner surface of the core, work piece, or the like 28. This will be noted in FIG. 4. Upon an engagement of the shell with the inner surface of the work member 28 the shell itself will provide a straight and true surface for a rigid supporting and proper positioning of the work member 28. By the same token, the engagement of the elastomeric protrusions 26 against the inner surface of the work member 28 will provide for a significant frictional gripping of the work member 28 whereby any tendency for rotation, slippage or travelling of the work member 28 relative to the shaft 10 will be precluded. It will be appreciated that after the shell 12 has been pressure expanded into tight-fitting engagement with the interior of the work member 28, there will be a tendency for the internal pressure to forcibly compress the elastomeric projections 26 against the inner surface of the work member 28, thus enhancing the frictional grip thereof.

In the preferred situation, the clearance between the outer surface of the unexpanded shaft 10 and the inner surface of the work member 28 will be approximately in a range of from 0.003 to 0.015 inch. It is also contemplated that expansion of the shaft be effected at pressures in the range of from 50 to 200 psig.

The foregoing is considered illustrative of the principles of the invention, and since modifications and changes may occur to those skilled in the art, it is not desired to limit the invention to the exact construction and operation shown and described. Accordingly, all suitable modifications and equivalents may be resorted to, falling within the scope of the invention as claimed.

What is claimed as new and intended to be secured by Letters Patent is:

1. An expandable shaft for the mounting of cores, mandrels, blade holders, and working tools, said shaft comprising:

an expandable elastomeric liner and an expandable metal shell, said shell having multiple openings defined therethrough, said liner being received within and closely conforming to the interior of said shell with portions of the liner extending into and filling the openings defined through the shell, said shell and said liner defining a pressurizable internal chamber and said shell and liner being substantially simultaneously expandable upon pressurizing the internal chamber, and said shell and the liner portions extending through the openings presenting a smooth continuous outer shaft surface after being expanded.

2. The expandable shaft of claim 1 wherein said shell is cylindrical and expandable primarily solely in a radial direction.

3. The expandable shaft of claim 2, wherein said openings are spaced circumferentially and longitudinally about a major portion of said shell, said openings being elongated longitudinally of said shell.

4. The expandable shaft of claim 3, wherein said openings are provided in longitudinally extending rows, said rows being circumferentially spaced from each other, the openings in adjacent rows being longitudinally offset from each other.

5. The expandable shaft of claim 4, wherein the elongated openings in each row are of a length so as to overlap the elongated openings in the adjacent rows.

6. The expandable shaft of claim 5, wherein the majority of the elongated openings in each row are overlapped by two elongated openings in each adjacent row.

* * * * *